(No Model.)
A. DITTMER.
APPARATUS FOR DRESSING STONE.
No. 467,305. Patented Jan. 19, 1892.
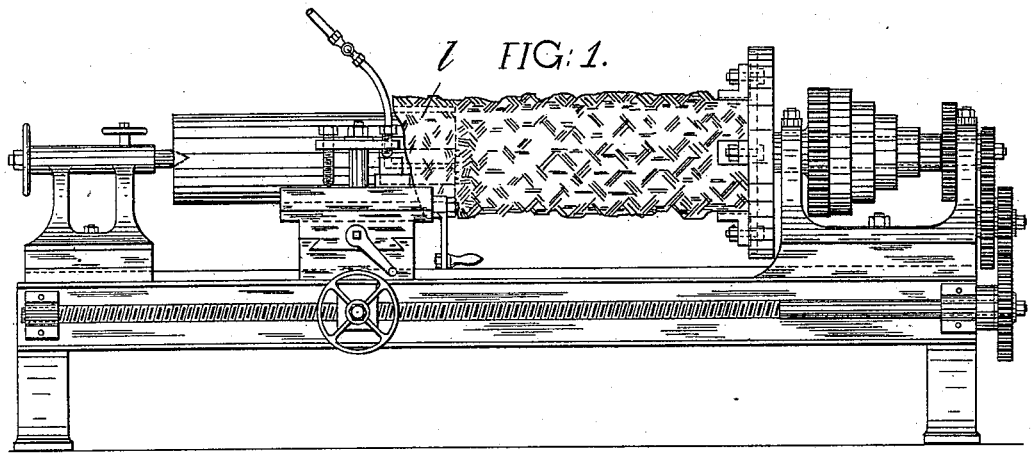
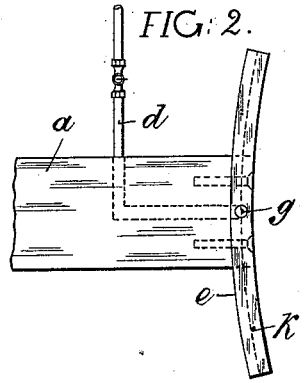
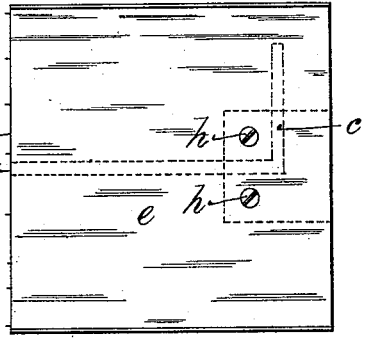
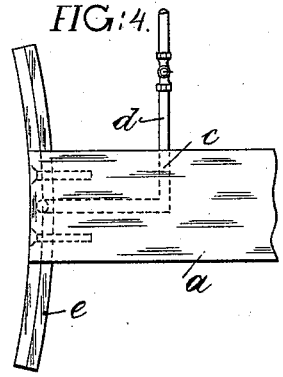
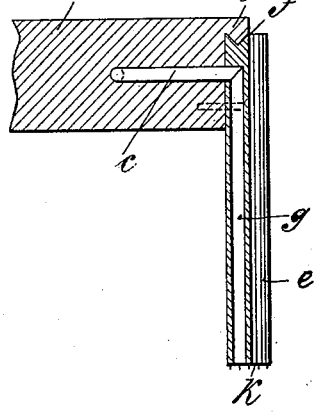
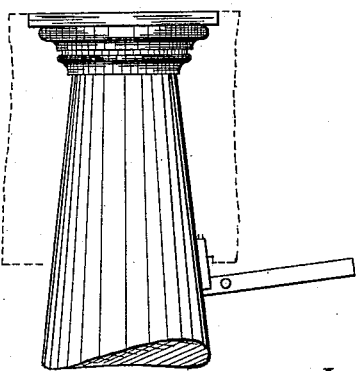
Witnesses:
Gustav Tauer
Alfred Meister
Inventor
Albert Dittmer
by his Attorney:
Edwin A. Brydges

UNITED STATES PATENT OFFICE.

ALBERT DITTMER, OF BERLIN, GERMANY.

APPARATUS FOR DRESSING STONE.

SPECIFICATION forming part of Letters Patent No. 467,305, dated January 19, 1892.

Application filed September 4, 1891. Serial No. 404,728. (No model.)

*To all whom it may concern:*

Be it known that I, ALBERT DITTMER, a subject of the Emperor of Germany, and a resident of the city of Berlin, in the Kingdom of Prussia, in the German Empire, have invented certain new and useful Improvements in Apparatus for Dressing Stone, of which the following is a specification.

This invention for improvements in apparatus for dressing stone consists in the manner or method of cutting or paring the stone and in the arrangement of the tool for cutting or paring. The tool is secured at right angles to the stock and is employed in such a manner that the stones to be dressed to a cornice or column or the like are pared or cut by removing an annular portion of the stone, leaving a center portion of the required form and an outer portion which is broken away by blows of a hammer or otherwise as the dressing progresses. The cutting-tool is secured with its cutting-edge corresponding to the finished contour of the stone to be dressed at the part of the stone to be cut away and parallel to the axis of the stone. The tool cuts a groove, leaving the outer surface of the stone projecting, so that it can be readily broken away to the end of the groove. After the cutting-tool is once properly set the stone can be dressed quickly and easily from the rough with considerably less power than can be done with any known methods by supporting and rotating it in a lathe and gradually moving the rest to which the stock of the tool is fixed along parallel to the axis of the work, a groove being first cut and then the outer portion broken off, so as to leave the work properly shaped without necessitating measurement during the process, as has been heretofore necessary. By employing this method and apparatus, by which the stone is cut in a longitudinal direction, instead of at right angles to this direction, as in the previously-known methods, very long and slender and very short stone can be dressed without risk of cracking or breaking. In addition the cutting-tool is considerably less worn, however hard the stone, than are the tools previously known.

In the accompanying sheets of illustrative drawings, Figure 1 is an elevation of the machine. Fig. 2 is a side elevation of the cutting apparatus. Fig. 3 is a front end elevation. Fig. 4 is a back end elevation; and Fig. 5 is a section through A B, Figs. 1 and 2, of the same. Fig. 6 shows the manner of applying the apparatus to the dressing of a column from the rough stone.

The cutting apparatus consists of a stock $a$, provided with a guide $b$, the passage $c$, and tube $d$, and of the cutting-tool $e$, with the guiding-groove $f$ and the passage $g$. The cutting-tool $e$ is firmly secured to the stock $a$ by the screws $h$, and preferably perpendicularly to it, so that different cutting-tools, as desired, may be employed with one stock. The real cutting-surface $k$ of the cutting-tool $e$ is, according to the material to be worked, of steel and serrated, or, as in the present case, provided with diamonds, and is always shaped according to the object to be worked out. The passage $c$ in the stock $a$ and $g$ in the cutting-tool $e$ serve as a conduit for the necessary water during the dressing, or, also, if the material to be dressed is soft, such as limestone, for a supply of emery-powder. Over the tube-piece $d$ is drawn a rubber pipe, which communicates with a vessel filled with water or with a funnel filled with emery-powder.

Fig. 1 shows the manner in which this cutting apparatus is employed, which is as follows: The rough stone is prepared in the ordinary way for the required object and fixed in a lathe. The cutting apparatus is fastened by its stock $a$ to a sliding saddle or support in such a way that the cutting-tools $e$ can be forced into the stone as it is turned, Fig. 5. The cutting-tool is forced into the stone up to its stock $a$. The groove thus produced permits the piece $l$, projecting freely from the body of the stone, to be broken away by a blow or by an iron crow, so that in this way a perfect paring of the required object is produced—in this case a column, as shown in the figure. During the forcing of the cutting-tool $e$ sufficient water is continually supplied through $d$, $c$, and $g$ to the cut groove in order to cool the tool $e$, or in the case of soft stone only emery-powder is supplied in the same way through $d$, $c$, and $g$ to the cutting-surface, the feed being maintained by means of the shaking or jar produced by the working. When the object to be dressed is inclined or curved, then the saddle or support is guided in the well-known manner by a pattern or guide corresponding to the incline or curve, so that the cutting apparatus when once properly adjusted can follow up the cutting without further adjustment, even if the side to be dressed does not form a straight line, as shown in Fig. 6.

Having now particularly described and ascertained the nature of my said invention and in what manner the same is to be performed, I declare that what I claim is—

1. In an apparatus for dressing stone, the cutting-tool $e$, secured to the stock $a$ and provided with guide $f$ and cutting-surface $k$, and an emery or water passage through the stock $a$ and tool $e$, substantially as and for the purpose set forth.

2. In an apparatus for dressing stone, the combination, with stock $a$, provided with guide $b$, passage $c$, and tube $d$, of cutting-tool $e$, secured to stock $a$ by screws $h$ and provided with guiding-groove $k$ and passage $g$, substantially as set forth.

Signed at St. Petersburg, in the Empire of Russia, this 7th day of July, 1891.

ALBERT DITTMER.

Witnesses:
WOLDEMAR TRISK,
JULIUS KAMPE.